United States Patent
Ji et al.

(10) Patent No.: US 12,327,029 B2
(45) Date of Patent: Jun. 10, 2025

(54) MEMORY CONTROLLER FOR PERFORMING READ RECLAIM OPERATION, MEMORY SYSTEM INCLUDING THE SAME, AND OPERATING METHOD OF MEMORY CONTROLLER

(71) Applicant: SK hynix Inc., Icheon-si (KR)

(72) Inventors: Seung Gu Ji, Icheon-si (KR); Young Gyun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/542,110

(22) Filed: Dec. 15, 2023

(65) Prior Publication Data

US 2025/0021238 A1 Jan. 16, 2025

(30) Foreign Application Priority Data

Jul. 12, 2023 (KR) ................. 10-2023-0090694

(51) Int. Cl.
*G06F 3/06* (2006.01)
(52) U.S. Cl.
CPC .......... *G06F 3/0619* (2013.01); *G06F 3/0659* (2013.01); *G06F 3/0679* (2013.01)
(58) Field of Classification Search
CPC ..... G06F 3/0619; G06F 3/0659; G06F 3/0679
USPC .................................. 711/103, 102
See application file for complete search history.

(56) References Cited

U.S. PATENT DOCUMENTS

| 10,049,755 | B2 | 8/2018 | Lee et al. | |
| 2018/0341583 | A1* | 11/2018 | Son | G11C 16/349 |
| 2024/0126448 | A1* | 4/2024 | Chowdhury | G06F 3/0653 |

FOREIGN PATENT DOCUMENTS

| KR | 10-2021-0014337 A | 2/2021 |
| KR | 10-2310117 B1 | 10/2021 |

* cited by examiner

*Primary Examiner* — Hosain T Alam
*Assistant Examiner* — Zubair Ahmed

(57) ABSTRACT

A memory system comprises a memory device including a plurality of memory blocks, and a controller configured to manage a first count, a second count, and a sum value for each of the plurality of memory blocks, the first count being the number of performed random read operations, the second count being the number of performed sequential read operations, the sum value being calculated based on the first count and the second count, and configured to perform a read reclaim operation for a specific memory block among the plurality of memory blocks based on a comparison result of the sum value for the specific block with a reference value.

20 Claims, 7 Drawing Sheets

MEMORY CONTROLLER FOR PERFORMING READ RECLAIM OPERATION, MEMORY SYSTEM INCLUDING THE SAME, AND OPERATING METHOD OF MEMORY CONTROLLER

CROSS-REFERENCE TO RELATED APPLICATION

This application claims priority under 35 U.S.C. § 119 to Korean Patent Application No. 10-2023-0090694 filed on Jul. 12, 2023, which is incorporated herein by reference in its entirety.

BACKGROUND

1. Field

Embodiments relate to a memory system, and more particularly, to a memory controller for performing a read reclaim operation, a memory system including the memory controller, and an operating method of the memory controller.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories may be classified into a NOR-type memory and NAND-type memory.

Meanwhile, operations of a nonvolatile memory device may be divided into a program operation, a read operation, and an erase operation.

Here, the read operation indicates an operation of determining a state of the selected memory cell based on a threshold voltage level thereof, which may be substantially the same as a verification operation performed at the program operation and the erase operation.

Like this, in the read operation, the operation of checking the state of the selected memory cell as a target to be read may affect non-selected memory cells. For example, the threshold voltage level of the non-selected memory cells may be varied. This phenomenon is called as "read disturb," and data of the non-selected memory cells may be distorted if the read disturb is accumulated.

Therefore, the memory system having the nonvolatile memory device may perform a read reclaim operation which is an operation of moving valid data stored in a certain memory block to another memory block before a read count which is the number of iterated read operations, of the certain memory block reaches a preset number.

However, if the read reclaim operation is performed excessively frequently, the performance of the memory system may deteriorate.

SUMMARY

Various embodiments of the present disclosure are directed to providing a memory controller for performing a read reclaim operation at an appropriate time by managing read counts to which a different weight is applied in accordance with a type of the read operation, a memory system having the same, and an operating method of the memory controller.

Technical issues to be achieved in the present disclosure are not limited to the aforementioned technical issues and other unmentioned technical issues may be understood by those skilled in the art from the following description.

An aspect of an embodiment in the disclosure, a memory system may include: a memory device including a plurality of memory blocks; and a controller configured to manage a first count, a second count, and a sum value for each of the plurality of memory blocks, the first count being the number of performed random read operations, the second count being the number of performed sequential read operations, the sum value being calculated based on the first count and the second count, and configured to perform a read reclaim operation for a specific memory block among the plurality of memory blocks based on a comparison result of the sum value for the specific block with a reference value.

An aspect of an embodiment in the disclosure, a memory controller may include: an internal memory configured to store a first count, a second count, a sum value, and a reference value for each of a plurality of memory blocks included in a memory device; and a processor, when a first read command is inputted from a host, configured to compare the first read command with a second read command inputted prior to the first read command, increase the first count for a first block corresponding to the first read command when the first read command and the second read command do not indicate sequential read operations, selectively increase the second count for the first block based on whether the first block is the same as a second block corresponding to the second read command when the first read command and the second read command indicate sequential read operations, and selectively perform a read reclaim operation for the first block in accordance with a comparison result of the sum value for the first block with the reference value for the first block, wherein the sum value for the first block is calculated based on the first count for the first block and the second count for the first block.

An aspect of an embodiment in the disclosure, An operating method of a memory controller, may include: checking, when a first read command is inputted from a host, whether the first read command and a second read command inputted prior to the first read command indicate sequential read operations by comparing the first read command with the second read command; increasing a first count for a first block corresponding to the first read command when the first read command and the second read command do not indicate sequential read operations; selectively increasing a second count for the first block based on whether the first block is the same as a second block corresponding to the second read command when the first read command and the second read command indicate sequential read operations; and comparing a sum value for the first block with a reference value and selectively performing a read reclaim operation for the first block in accordance with a comparison result, wherein the sum value for the first block is calculated based on the first count and the second count.

According to an embodiment of the present disclosure, it is possible to increase a read count corresponding to a read operation by applying a different weight to the read account according to whether the read operation requested by a host is a random read operation or a sequential read operation.

Through this way, the read reclaim operation can be performed at an appropriate time without being excessively frequently performed.

DETAILED DESCRIPTION

Figure 1:
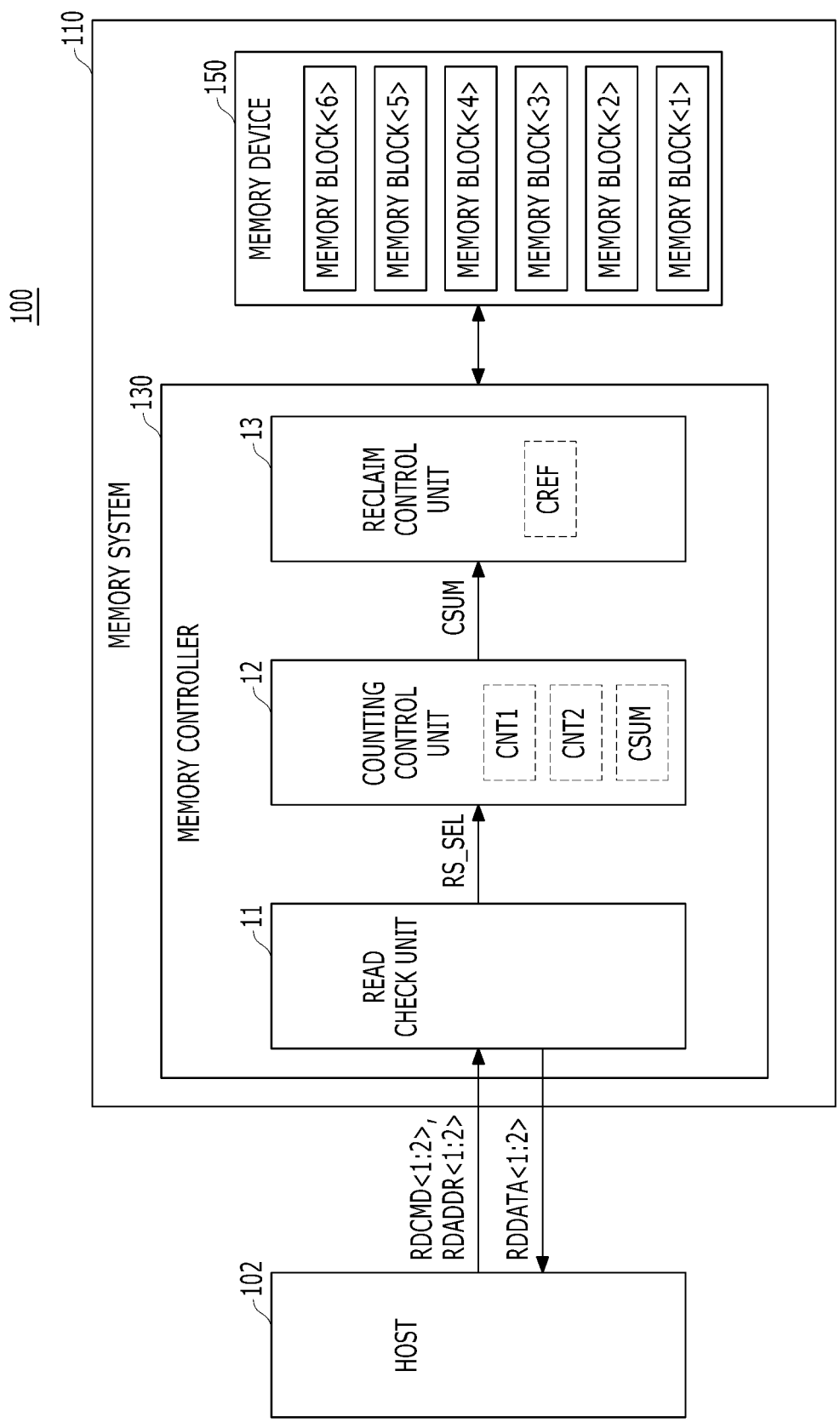
FIG. 1 is a diagram illustrating an example of a data processing system that includes a memory system according to an embodiment of the present disclosure.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to indicate that any such features may be included in one or more embodiments of the present disclosure.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional one or more components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to any of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions, and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). For example, the terms "first value" and "second value" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram illustrating an example of a data processing system that includes a memory system according to an embodiment of the present disclosure.

Figure 2:
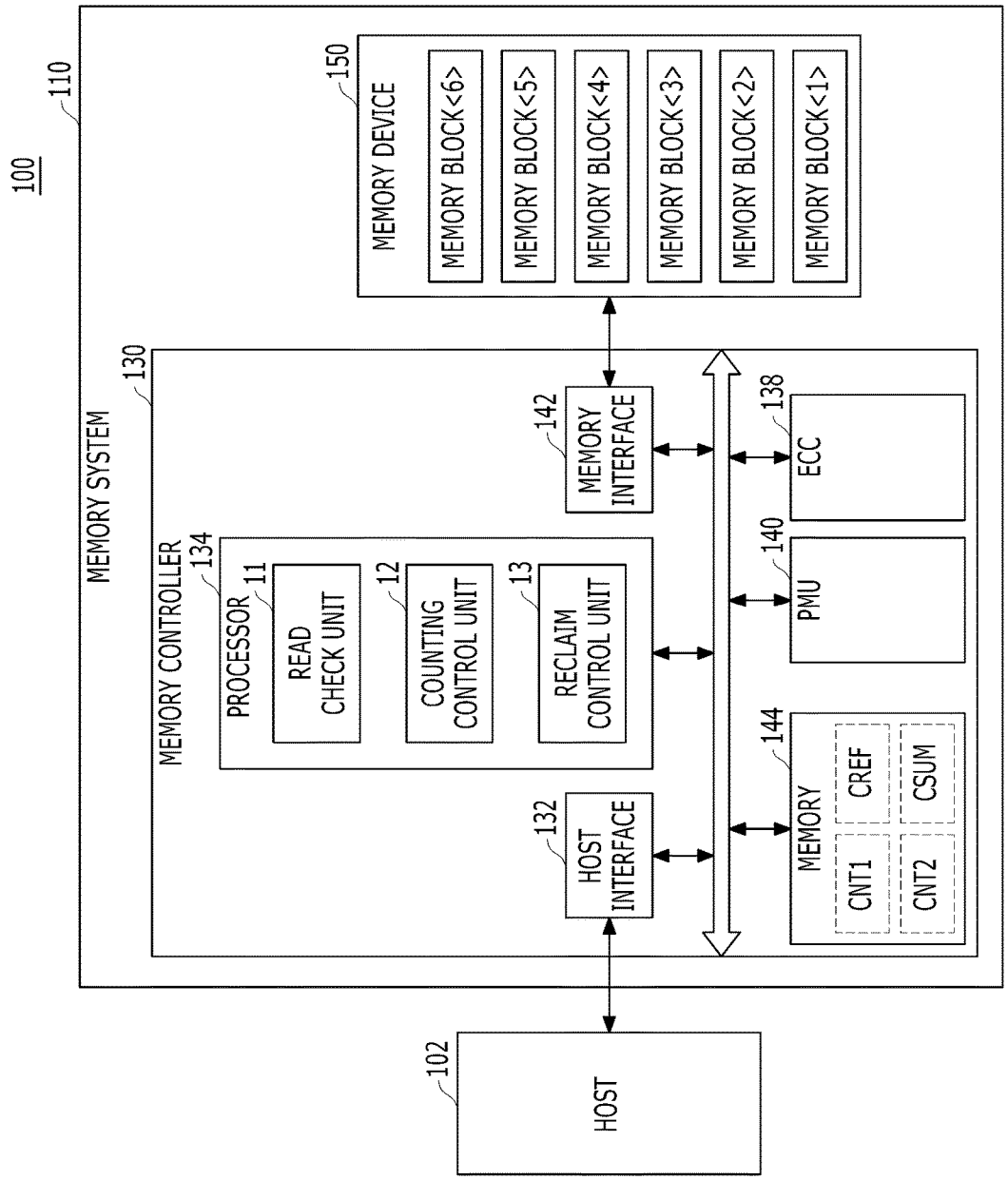
FIG. 2 is a diagram illustrating another example of a data processing system that includes a memory system according to an embodiment of the present disclosure.

FIG. 2 is a diagram illustrating another example of a data processing system that includes a memory system according to an embodiment of the present disclosure.

Referring to FIGS. 1 and 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller (e.g., memory controller) 130. The memory device 150 and the controller 130 in the memory system 110 may be considered components or elements physically separated from each other. The memory device 150 and the controller 130 may be connected via at least one data path. For example, the data path may include a channel and/or a way.

A memory controller 130 may include a read check unit 11, a counting control unit 12, and a reclaim control unit 13. According to an embodiment of the disclosure, as illustrated in FIG. 1, the read check unit (e.g., read check circuit) 11, the counting control unit (e.g., counting control circuit) 12, and the reclaim control unit (e.g., reclaim control circuit) 13 included in the memory controller 130 may be structured as hardware in the memory controller 130. According to another embodiment of the disclosure, as illustrated in FIG. 2, the read check unit 11, the counting control unit 12, and the reclaim control unit 13 included in the memory controller 130 may be embodied as software, loaded on a memory 144 of the memory controller 130, and performed by a processor 134.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

The controller 130 may control the memory device 150 to perform read, program, and erase operations corresponding to commands inputted from the host 102, and the memory system 110 . . . may independently perform the operations regardless of commands inputted from an external device such as the host 102. Regarding the memory device 150, the controller 130 may perform operations for garbage collection, wear leveling, read reclaim, and a bad management to checking and processing a bad block.

The memory device 150 may include a plurality of memory blocks MEMORY BLOCK<1:6>. The memory blocks MEMORY BLOCK<1:6> may be understood as a group of non-volatile memory cells from which data are removed together through the erase operation. Each of the memory blocks MEMORY BLOCK<1:6> may include a page (not illustrated) in which the non-volatile memory cells are grouped, from a logical point of view, such as storing of data together during the program operation or outputting of data together during the read operation. For example, one memory block may include a plurality of pages. One page may include a plurality of non-volatile memory cells.

From a physical point of view different from the logical point of view such as the program operation or the read operation, one memory block may include a plurality of word lines (not illustrated). One word line may be coupled to a plurality of non-volatile memory cells.

In this case, one word line may correspond to at least one page according to the number of bits that can be stored or expressed in one non-volatile memory cell. For example, when one non-volatile memory cell is a single level cell (SLC) storing one data bit, one word line may correspond to one page. In other words, a plurality of single level cells (SLCs) may be coupled to a single word line to commonly share the word line, thereby constitute a single page. When one non-volatile memory cell is a double level cell (DLC) storing two data bits, one word line may correspond to two pages. When one non-volatile memory cell is a triple level cell (TLC) storing three data bits, one word line may correspond to three pages. When one non-volatile memory cell is a quadruple level cell (QLC) storing four data bits, one word line may correspond to four pages. In this way, when one non-volatile memory cell is a multiple level cell storing five or more data bits, one word line may correspond to five or more pages.

According to an embodiment, the controller 130 may use a multi-level cell (MLC) memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored another 1-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a read only memory (ROM), a mask read only memory (MROM), a programmable read only memory (PROM), an erasable read only memory (EPROM), an electrically erasable read only memory (EEPROM), a ferromagnetic read only memory (FROM), a resistive random access memory (RRAM), a phase change random access memory (PCRAM), a ferroelectrics random access memory (FRAM), a spin transfer torque random access memory (STT-RAM), or a spin transfer torque magnetic random access memory (STT-MRAM), or the like.

Examples of the data processing system 100 including the host 102 interworking with the memory system 110 or the memory system 110 may include a mobility electronic device such as an automotive, a portable electronic device such as a mobile phone, an MP3 player and a laptop computer and a non-portable electronic device such as a desktop computer, a game machine, a TV and a projector. The host 102 may provide interaction between the host 102 and a user using the data processing system 100 or the memory system 110 through at least one operating system (OS). The host 102 may transmit a plurality of commands corresponding to requests of the user to the memory system 110, and the memory system 110 may perform operations corresponding to the plurality of commands, i.e., operations corresponding to the requests of the user.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The memory controller 130 may manage a first count CNT1 counting the number of performed random read operations and a second count CNT2 counting the number of performed sequential read operations for each of a plurality of memory blocks MEMORY BLOCK<1:6> included in a memory device 150. According to an embodiment of the disclosure, the memory controller 130 may manage, e.g., generate and update the first count CNT1 and the second count CNT2 for each of the plurality of memory blocks MEMORY BLOCK<1:6> in the memory 144 included therein.

Furthermore, the memory controller 130 may manage a sum value CSUM which is calculated based on the first count CNT1 and the second count CNT2. In an embodiment, the memory controller 130 may manage a sum value CSUM which is a value obtained by summing a value obtained by applying a first weight to the first count CNT1 and a value obtained by applying a second weight to the second count CNT1. Here, the memory controller 130 may set the second weight to be greater than the first weight. In an embodiment, the memory controller 130 may set the second weight to be in a range from 7000 times and 10000 times greater than the first weight. If the second weight is smaller than 7000 times the first weight, read reclaim operations may not be sufficiently frequently performed to substantially prevent read disturb error in the memory device 110. If the second weight is greater than 10000 times the first weight, read reclaim operations may be excessively frequently performed to significantly deteriorate performance of the memory system 110. For example, the memory controller 130 may set the second weight to be 8500 times greater than the first weight. In other words, the memory controller 130 may set the weights so that one sequential read operation corresponds to 8500 random read operations. Each of the first weight and the second weight may be variously set in accordance with the type of the memory device 150 and operation environments of the memory system 110. According to another embodiment of the disclosure, the memory controller 130 may manage, e.g., generate and update the sum value CSUM for each of the plurality of memory blocks MEMORY BLOCK<1:6> in a memory (e.g., memory 144 in FIG. 2) included therein.

Furthermore, the memory controller 130 may perform a read reclaim operation for a specific memory block among the plurality of memory blocks MEMORY BLOCK<1:6> based on a comparison result of the sum value CSUM of the specific memory block with a reference value CREF. In an embodiment, the memory controller 130 may perform a read reclaim operation for the memory block in which the sum value CSUM is greater than a reference value CREF among the plurality of memory blocks MEMORY BLOCK<1:6>. Specifically, the memory controller 130 may perform a read reclaim operation on a specific memory block among the plurality of memory blocks MEMORY BLOCK<1:6>, when the sum value CSUM for the specific memory block is greater than a reference value CREF. For example, the memory controller 130 may set the reference value CREF as 10 to the sixth power, and perform the read reclaim operation for the memory block in which the sum value CSUM is greater than 10 to the sixth power among the plurality of memory blocks MEMORY BLOCK<1:6>.

At this time, the read reclaim operation may mean an operation of moving valid data stored on a target memory block to another memory block. For example, the memory controller 130 may perform the read reclaim operation of moving the valid data stored on a memory block in which the sum value CSUM is greater than 10 to the 6th power among the memory blocks MEMORY BLOCK<1:6> to another memory block.

In more detail, when a first read command RDCMD<1> is inputted from the host 102, the read check unit 11 included in the memory controller 130 may compare the first read command RDCMD<1> with a second command RDCMD<2> that is inputted prior to the first read command RDCMD<1>, and check whether the first read command RDCMD<1> and the second command RDCMD<2> are sequential read operations.

Here, it may be seen that the memory controller 130 assumes the read command currently inputted from the host 102 as "the first read command RDCMD<1>" and the read command inputted prior to the first read command RDCMD<1>, to which the read operation corresponds was already completed, as "the second command RDCMD<2>." In other words, based on the time at which the read command is inputted from the host 102, the first read command RDCMD<1> and the second command RDCMD<2> may be identified.

Furthermore, the memory controller 130 may read first data RDDATA1 stored on a first block indicated by a first read address RDADDR<1> among the plurality of memory blocks MEMORY BLOCK<1:6> in response to the first read command RDCMD<1> inputted from the host 102, and output the read first data RDDATA1 to the host 102. In other words, the memory block corresponding to the first read command RDCMD<1> may be assumed as "the first block" and the data stored on one of a plurality of pages included in the first block may be assumed as "the first data RDDATA1."

Furthermore, the memory controller 130 may read second data RDDATA2 stored on a second block indicated by a second read address RDADDR<2> among the plurality of memory blocks MEMORY BLOCK<1:6> in response to the second read command RDCMD<2> inputted from the host 102, and output the read second data RDDATA2 to the host 102. In other words, the memory block corresponding to the second read command RDCMD<2> may be assumed as "the second block" and the data stored on one of a plurality of pages included in the second block may be assumed as "the second data RDDATA2."

Therefore, the read check unit 11 may determine whether the first read command RDCMD<1> and the second read command RDCMD<2> are sequential read operations based on whether the first read address RDADDR<1> corresponding to the first read command RDCMD<1> and the second read address RDADDR<2> corresponding to the second read command RDCMD<2> are consecutive. For example, if the first read address RDADDR<1> and the second read address RDADDR<2> are consecutive, the read check unit 11 may determine that the first read command RDCMD<1> and the second read command RDCMD<2> are sequential read operations. In contrast, if the first read address RDADDR<1> and the second read address RDADDR<2> are not consecutive, the read check unit 11 may determine that the first read command RDCMD<1> and the second read command RDCMD<2> are not sequential read operations, i.e., random read operations.

Furthermore, if the read check unit 11 determines the first read command RDCMD<1> and the second read command RDCMD<2> as not the sequential read operations, i.e., the random read operations, the read check unit 11 may generate and output a signal RS_SEL having a first value corresponding to the check result.

Furthermore, if the read check unit 11 determines the first read command RDCMD<1> and the second read command RDCMD<2> as the sequential read operations, the read check unit 11 may further check whether the first block corresponding to the first read command RDCMD<1> and the second block corresponding to the second read command RDCMD<2> are the same block.

In other words, if the read check unit 11 determines that the first read command RDCMD<1> and the second read command RDCMD<2> are the sequential read operations and the first block and the second block are not the same block, the read check unit 11 may generate and output a signal RS_SEL having a second value corresponding to the check result.

Furthermore, if the read check unit 11 determines that the first read command RDCMD<1> and the second read command RDCMD<2> are the sequential read operations and the first block and the second block are the same block, the read check unit 11 may generate and output a signal RS_SEL having a third value corresponding to the check result.

The counting control unit 12 included in the memory controller 130 may calculate a first count CNT1, a second count CNT2, and a sum value CSUM, for the first block corresponding to the first read command RDCMD<1> among the plurality of memory blocks MEMORY BLOCK<1:6> according to the check result signal RS_SEL from the read check unit 11 and update the values stored in the memory 144 included therein.

The counting control unit 12 may increase the first count CNT1 for the first block corresponding to the first read command RDCMD<1> in response to the signal RS_SEL having the first value received from the read check unit 11. In other words, the counting control unit 12 may increase the first count CNT1 for the first block corresponding to the first read command RDCMD<1> in response to the determination by the read check unit 11 that the first read command RDCMD<1> and the second read command RDCMD<2> are the random read operations. The memory controller 130 may update the first count CNT1 which is increased by the operation of the counting control unit 12, in the memory 144.

Furthermore, the counting control unit 12 may selectively increase the second count CNT2 for the first block corresponding to the first read command RDCMD<1> in response to the signal RS_SEL having the second value or the third value received from the read check unit 11. In other words, when the first read command RDCMD<1> and the second read command RDCMD<2> are determined as the sequential read operations by the read check unit 11, the counting control unit 12 may selectively increase the second count CNT2 for the first block based on whether the first block corresponding to the first read command RDCMD<1> and the second block corresponding to the second read command RDCMD<2> are the same block. The memory controller 130 may update the increased second count CNT2 in the memory 144 if the second count CNT2 is increased by the operation of the counting control unit 12.

According to an embodiment of the present disclosure, the counting control unit 12 may increase the second count CNT2 for the first block corresponding to the first read command RDCMD<1> in response to the signal RS_SEL having the second value received from the read check unit 11. In other words, the counting control unit 12 may increase the second count CNT2 for the first block corresponding to the first read command RDCMD<1> if the read check unit 11 determines that the first read command RDCMD<1> and the second read command RDCMD<2> are the sequential read operations and the first block corresponding to the first read command RDCMD<1> is a different block from the second block corresponding to the second read command RDCMD<2>. The memory controller 130 may update the second count CNT2 which is increased by the operation of the counting control unit 12, in the memory 144.

According to an embodiment of the present disclosure, the counting control unit 12 may keep the second count CNT2 for the first block corresponding to the first read command RDCMD<1> in response to the signal RS_SEL having the third value received from the read check unit 11. In other words, the counting control unit 12 may keep the second count CNT2 for the first block corresponding to the first read command RDCMD<1> without increment if the read check unit 11 determines that the first read command RDCMD<1> and the second read command RDCMD<2> are the sequential read operations and the first block corresponding to the first read command RDCMD<1> is the same block as the second block corresponding to the second read command RDCMD<2>. At this time, keeping the second count CNT2 for the first block without increment on receipt of the signal RS_SEL having third vale from the read check unit 11 may indicate neither the first count CNT1 nor the second count CNT2 for the first block is increased and they are kept as the current value respectively. The memory controller 130 may not update but keep the second count CNT2 stored in the memory 144 because the second count CNT2 is kept instead of increment by the operation of the counting control unit 12.

Furthermore, the counting control unit 12 may calculate the sum value CSUM by adding a first value obtained by applying a first weight to the first count CNT1 to a second value obtained by applying a second weight to the second count CNT2, after selectively controlling the first count CNT1 and the second count CNT2 for the first block in response to the signal RS_SEL received from the read check unit 11. At this time, the first weight and the second weight are respectively preset and stored in the counting control unit 12 or a separate space in the memory controller 130. According to an embodiment of the present disclosure, the first weight and the second weight may be respectively stored in the memory 144 included in the memory controller 130. According to another embodiment of the present disclosure, the first weight and the second weight are respectively stored in a latch (not illustrated) included in the counting control unit 12.

The reclaim control unit 13 included in the memory controller 130 may compare the sum value CSUM for the first block corresponding to the first read command RDCMD<1> with a reference value CREF, and selectively perform the read reclaim operation for the first block in accordance with the comparison result.

The reclaim control unit 13 may perform the read reclaim operation for the first block if the sum value CSUM for the first block corresponding to the first read command RDCMD<1> is greater than the reference value CREF. Furthermore, the reclaim control unit 13 may not perform the read reclaim operation for the first block if the sum value CSUM for the first block corresponding to the first read command RDCMD<1> is equal to or smaller than the reference value CREF.

To summarize, the memory controller 130 may manage the first count CNT1, the second count CNT2, and the sum value CSUM for each of the plurality of memory blocks MEMORY BLOCK<1:6>. At this time, the first count CNT1, the second count CNT2, and the sum value CSUM for each of the plurality of memory blocks MEMORY BLOCK<1:6> may be stored in the memory 144 of the memory controller 130 as shown in FIG. 2.

Furthermore, the read check unit 11, the counting control unit 12, and the reclaim control unit 13 included in the memory controller 130 may perform operations for a certain memory block at the time of receiving the read command for the certain memory block among the plurality of memory blocks MEMORY BLOCK<1:6> from the host 102. For example, at the time of receiving the read command corresponding to the second memory block MEMORY BLOCK<2> among the plurality of memory blocks MEMORY BLOCK<1:6> from the host 102, the read check unit 11 may check the read command corresponding to the second memory block MEMORY BLOCK<2>, the counting control unit 12 may perform the operation of calculating the first count CNT1, the second count CNT2, and the sum value CSUM for the second memory block MEMORY BLOCK<2>, and the reclaim control unit 13 may selectively perform the read reclaim operation for the second memory block MEMORY BLOCK<2>.

According to an embodiment shown in FIG. 2, the controller 130 may include a host interface 132, a processor 134, the error correction circuitry (ECC) 138, a power management unit (PMU) 140, a memory interface 142, and a memory 144. The elements of the memory controller 130 described with reference to FIG. 2 may be varied in accordance with embodiments, operation performance, etc., of the memory system 110. The elements included in the memory controller 130 may be added or removed in accordance with other embodiments of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 and/or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween.

Examples of communication standards or interfaces used to transmit/receive data may include various form factors such as 2.5-inch form factor, 1.8-inch form factor, MO-297, MO-300, M.2, and EDSFF (Enterprise and Data Center SSD Form Factor) and various communication standards or interfaces such as USB (Universal Serial Bus), MMC (Multi-Media Card), PATA (Parallel Advanced Technology Attachment), SCSI (Small Computer System Interface), ESDI (Enhanced Small Disk Interface), IDE (Integrated Drive Electronics), PCIe (Peripheral Component Interconnect Express), SAS (Serial-attached SCSI), SATA (Serial Advanced Technology Attachment), and MIPI (Mobile Industry Processor Interface).

According to an embodiment, the host interface 132 is a type of layer for exchanging data with the host 102 and is implemented with, or driven by, firmware called a host interface layer (HIL). According to an embodiment, the host interface 132 can include a command queue.

The non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

The error correction unit (e.g., error correction circuitry) 138 may check and correct errors in data transmitted between the controller 130 and the memory device 150. The error correction unit 138 may be implemented as a separate module, circuit or firmware in the controller 130, but also be implemented in the memory device 150 according to an embodiment.

The error correction circuitry 138 may include all circuits, modules, systems, and/or devices for performing the error correction operation based on at least one of the above-described codes.

The error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal, e.g., a correction success signal or a correction fail signal, based on a result of the error correction decoding. The error correction circuitry 138 may use a parity bit, which has been generated during the ECC encoding process for the data stored in the memory device 150, in order to correct the error bits of the read data entries. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like.

An operation performed by the ECC decoder, that is, an operation of detecting and correcting errors included in read data, may be an operation distinct from the above-described read retry operation. According to an embodiment, the controller 130 may perform an error correction decoding operation through the ECC decoder when errors equal to or greater than a reference value occur even though the read retry operation, which is a repeated read operation, has been performed using the plurality of read retry levels.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data for operations performed in the memory system 110 and the controller 130. For example, the memory 144 may temporarily store read data entries output from the memory device 150 in response to a read request from the host 102 before the read data entries are output to the host 102. In addition, the controller 130 may temporarily store write data entries input from the host 102 in the memory 144 before programming the write data entries in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments of the present disclosure are not limited thereto. The memory 144 may be located within or external to the controller 130. For instance, the memory 144 may be embodied by an external volatile memory having a memory interface transferring data and/or signals between the memory 144 and the controller 130.

In addition to the read data entries or write data entries, the memory 144 may store information, e.g., map data, read requests, program requests, etc. used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation. According to an embodiment of the present disclosure, the memory 144 may store the first count CNT1, the second count CNT2, and the sum value CSUM for each of the plurality of memory blocks MEMORY BLOCK<1:6> therein. The memory 144 may further store the reference value CREF used to determine whether to perform the reclaim operation therein. Furthermore, the memory 144 may store the first weight and the second weight used to calculate the sum value CSUM therein.

The processor 134 may control the overall operations of the memory system 110. For example, the processor 134 can control a program operation or a read operation of the memory device 150 in response to a write request or a read request entered from the host 102.

According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor. According to an embodiment of the present disclosure, a processor 134 may include the read check unit 11, the counting control unit 12, and the reclaim control unit 13 as mentioned above.

Figure 3:
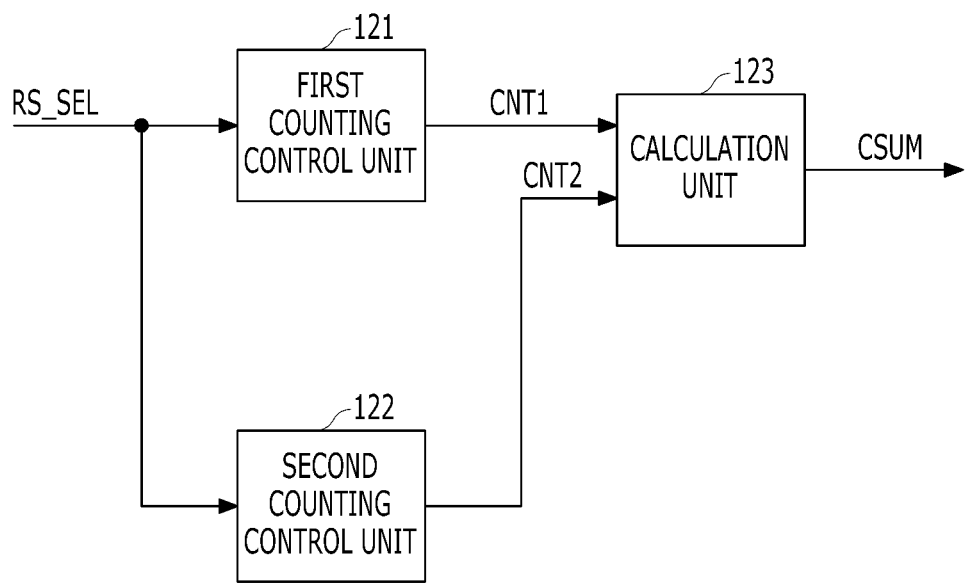
FIG. 3 is a diagram illustrating a detailed configuration of a counting control unit of the memory system in FIG. 1 according to an embodiment of the present disclosure.

FIG. 3 is a diagram illustrating a detail configuration of a counting control unit of a memory system (e.g., the memory system 110 in FIG. 1) according to an embodiment of the present disclosure.

Figure 4A:
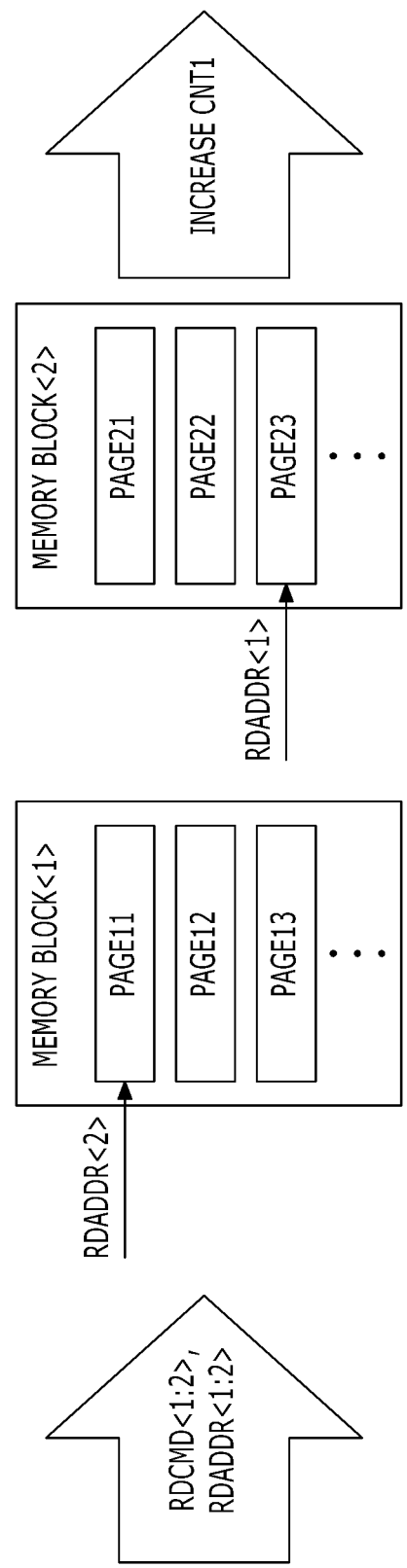
FIGS. 4A, 4B, and 4C are diagrams illustrating an example of operations of increasing read counts in the memory system according to an embodiment of the present disclosure.
Figure 4B:
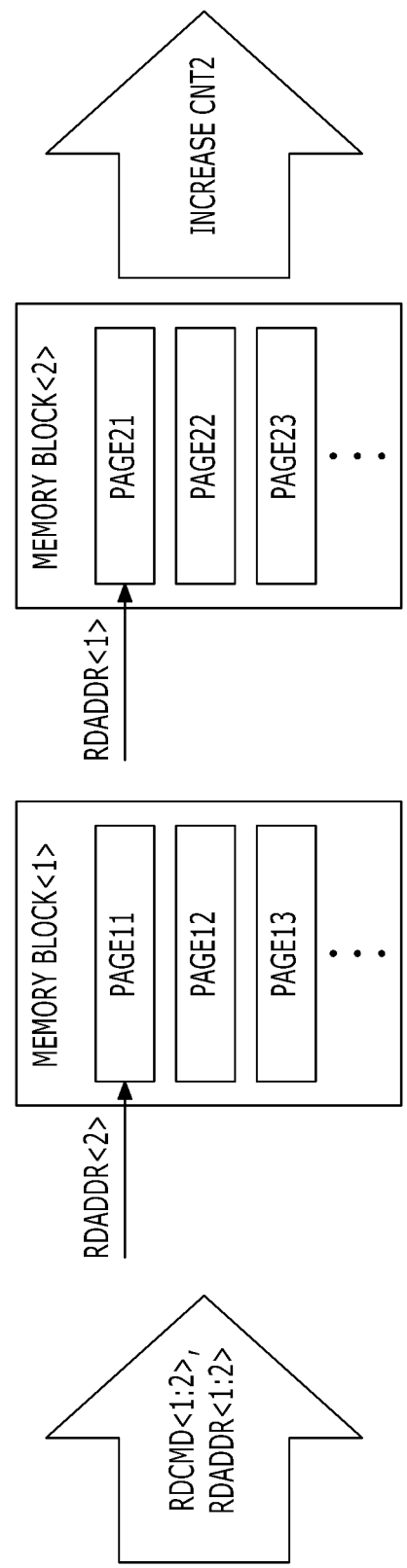
Figure 4C:
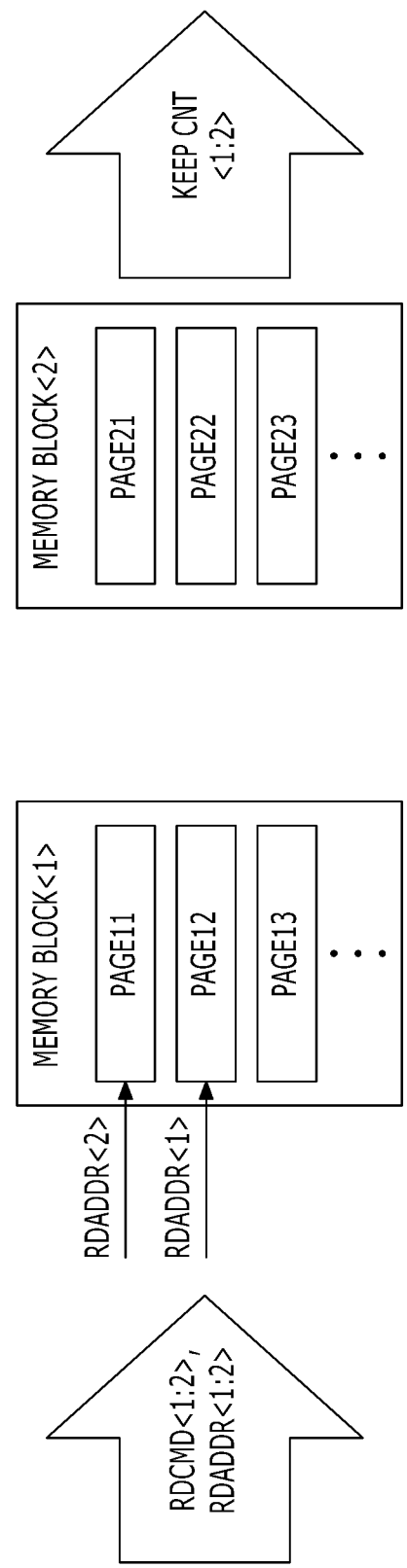

FIGS. 4A, 4B, and 4C are diagrams illustrating an example of operations for increasing read counts in the memory system according to an embodiment of the present disclosure.

Referring to FIG. 3, the counting control unit 12 included in the memory controller 130 of the memory system 110 may include a first counting control unit 121, a second counting control unit 122, and a calculation unit 123. As described with reference to FIGS. 1 and 2, the counting control unit 12 may be included in the memory controller 130 as the hardware or may be embodied as the software and operated by the processor 134 included in the memory controller 130. Accordingly, the first counting control unit 121, the second counting control unit 122, and the calculation unit 123, which are included in the counting control unit 12, may be embodied as the hardware and included in the memory controller 130 or may be embodied as the software and operated by the processor 134 included in the memory controller 130.

Here, the first counting control unit 121 may increase the first count CNT1 for the first block corresponding to the first read command RDCMD<1> in response to the determination by the read check unit 11 that the first read command RDCMD<1> and the second read command RDCMD<2> are not sequential read operations, i.e., the random read operations.

Referring to FIG. 4A together, the memory controller 130 may read data stored in the first page PAGE11 of the first memory block MEMORY BLOCK<1> in response to the second read command RDCMD<2> and the second address RDADDR<2>, and subsequently read data stored in the third page PAGE23 of the second memory block MEMORY BLOCK<2> in response to the first read command RDCMD<1> and the first read address RDADDR<1>.

At this time, it is determined that the first page PAGE11 of the first memory block MEMORY BLOCK1 and the third page PAGE23 of the second memory block MEMORY BLOCK2 are not consecutive. In other words, the second read address RDADDR<2> and the first read address RDADDR<1> are not consecutive.

Therefore, the read check unit 11 may determine that the first read command RDCMD<1> and the second read command RDCMD<2> are not sequential read operations and generate the signal RS_SEL having a first value. The first counting control unit 121 may increase the first count CNT1 for the first block corresponding to the first read command RDCMD<1>, i.e., the second memory block MEMORY BLOCK<2>, in response to the signal RS_SEL having the first value which is generated by the read check unit 11.

Though the signal RS_SEL generated by the read check unit 11 may be inputted to the first counting control unit 121 and the second counting control unit 122 in parallel, since the signal RS_SEL has the first value, only the first counting control unit 121 may work but the second counting control unit 122 may not work. In other words, when the signal RS_SEL has the first value, the first counting control unit (e.g., first counting circuit) 121 increases the first count CNT1 by a given amount, whereas the second counting control unit (e.g., second counting circuit) 122 keeps the second count CNT2 constant.

The second counting control unit 122 may increase the second count CNT2 for the first block corresponding to the first read command RDCMD<1> in response to the determination by the read check unit 11 that the first read command RDCMD<1> and the second read command RDCMD<2> are sequential read operations and the first block corresponding to the first read command RDCMD<1> and the second block corresponding to the first read command RDCMD<2> are not the same block.

Referring to FIG. 4B together, the memory controller 130 may read data stored in the first page PAGE11 of the first memory block MEMORY BLOCK<1> in response to the second read command RDCMD<2> and the second read address RDADDR<2>, and subsequently read data stored in the first page PAGE21 of the second memory block MEMORY BLOCK<2> in response to the first read command RDCMD<1> and the first read address RDADDR<1>.

At this time, it can be seen that the first page PAGE11 of the first memory block MEMORY BLOCK<1> and the first page PAGE21 of the second memory block MEMORY BLOCK<2> are consecutive and different memory blocks from each other. In other words, it can be seen that the second read address RDADDR<2> and the first address RDADDR<1> are consecutive and indicate different memory blocks from each other.

Therefore, the read check unit 11 may determine that the first read command RDCMD<1> and the second read command RDCMD<2> are sequential read operations and the first block and the second block are different from each other, and generate the signal RS_SEL having the second value. The second counting control unit 122 may increase the second count CNT2 for the first block corresponding to the first read command RDCMD<1>, i.e., the second memory block MEMORY BLOCK2, in response to the signal RS_SEL having the second value which is generated by the read check unit 11.

Though the signal RS_SEL generated by the read check unit 11, may be inputted to the first counting control unit 121 and the second counting control unit 122 in parallel, since the signal RS_SEL has the second value, only the second counting control unit 122 may work but the first counting control unit 121 may not work. In other words, when the signal RS_SEL has the second value, the second counting control unit (e.g., second counting circuit) 122 increases the second count CNT2 by a given amount, whereas the first counting control unit (e.g., first counting circuit) 121 keeps the first count CNT1 constant.

Furthermore, the second counting control unit 122 may not increase but keep the second count CNT2 for the first block corresponding to the first read command RDCMD<1> in response to the signal indicating that the read check unit 11 determines the first read command RDCMD<1> and the second read command RDCMD<2> as sequential read operations and the first block corresponding to the first read command RDCMD<1> and the second block corresponding to the first read command RDCMD<2> as the same block.

Referring to FIG. 4C together, the memory controller 130 may read data stored in the first page PAGE11 of the first memory block MEMORY BLOCK<1> in response to the second read command RDCMD<2> and the second read address RDADDR<2>, and subsequently read data stored in the second page PAGE12 of the first memory block MEMORY BLOCK<1> in response to the first read command RDCMD<1> and the first read address RDADDR<1>.

At this time, it can be seen that the first page PAGE11 of the first memory block MEMORY BLOCK<1> and the second page PAGE12 of the first memory block MEMORY BLOCK<1> are consecutive pages and are the same memory block. In other words, it can be seen that the second read address RDADDR<2> and the first address RDADDR<1> are consecutive and indicate the same memory block.

Therefore, the read check unit 11 may determine that the first read command RDCMD<1> and the second read command RDCMD<2> are sequential read operations and the first block and the second block are the same memory block, and generate the signal RS_SEL having the third value. The second counting control unit 122 may keep the second count CNT2 for the first block corresponding to the first read command RDCMD<1>, i.e., the second memory block MEMORY BLOCK2, instead of increasing the second count CNT2, in response to the signal RS_SEL having the third value which is generated by the read check unit 11.

Though the signal RS_SEL generated by the read check unit 11 may be inputted to the first counting control unit 121 and the second counting control unit 122 in parallel, since the signal RS_SEL has the third value, only the second counting control unit 122 may work but the first counting control unit 122 may not work. Therefore, when the signal RS_SEL having the third value is generated in the read check unit 11, both the first and second counts CNT<1:2> for the first block corresponding to the first read command RDCMD<1>, i.e., the second memory block MEMORY BLOCK<2> may be kept without increment.

The calculation unit 123 may calculate the sum value CSUM by adding a first value obtained by applying the first weight to the first count CNT1 outputted from the first counting control unit 121 to a second value obtained by applying the second weight to the second count CNT2 outputted from the second counting control unit 122.

Figure 5:
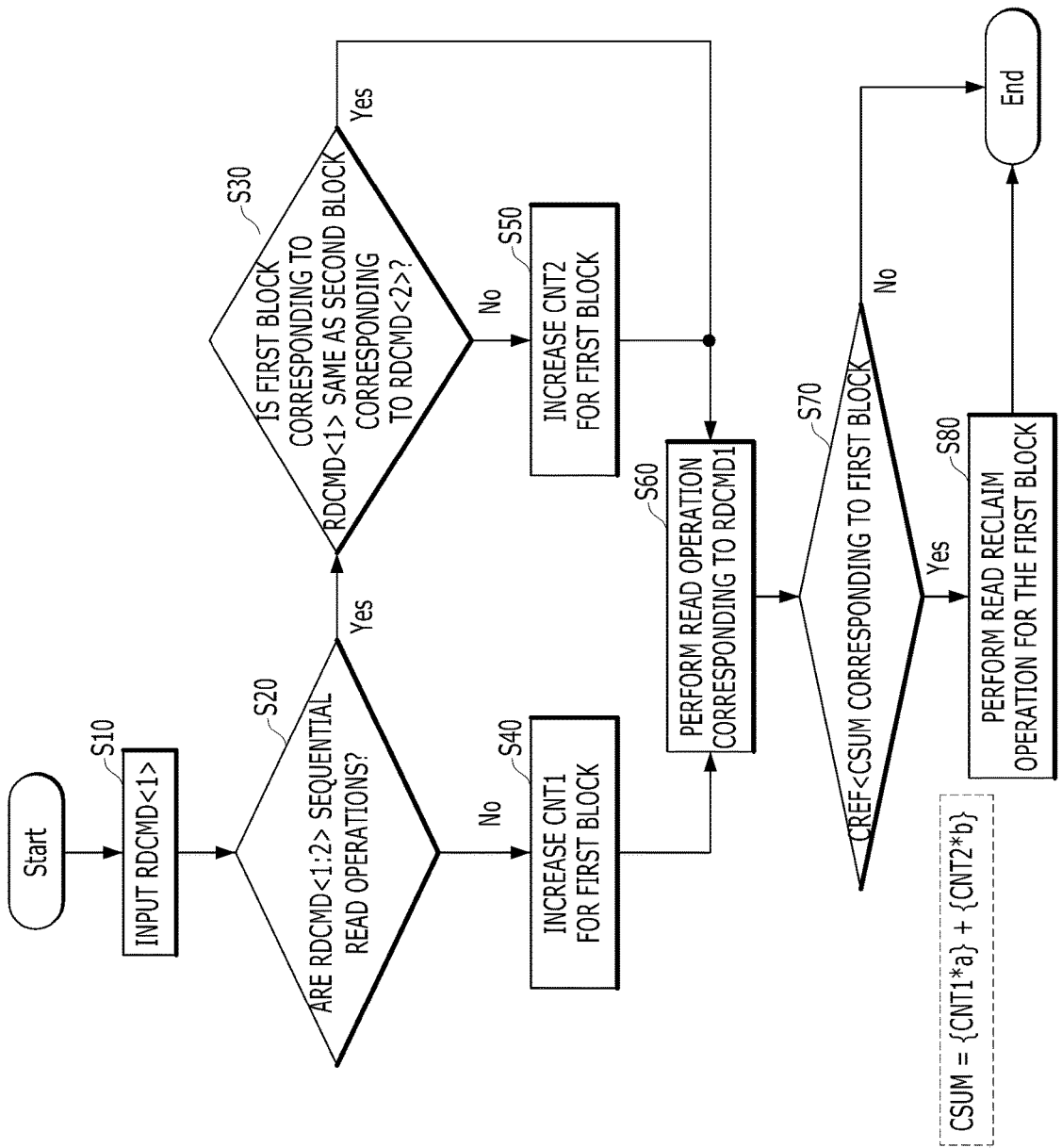
FIG. 5 is a flow chart illustrating an order of operations of controlling read counts in the memory system according to an embodiment of the present disclosure.

FIG. 5 is a flow chart illustrating an order of operations of controlling read counts in a memory system (e.g., the memory system 110 in FIG. 1 or FIG. 2) according to an embodiment of the present disclosure.

Referring to FIG. 5, a first read command RDCMD<1> may be inputted from the host 102 at step S10.

It may be determined whether the first read command RDCMD<1> inputted at step S10 and a second read command RDCMD<2> inputted prior to the first read command RDCMD<1> indicate sequential operations at step S20. In other words, at step S20, it may be determined whether the first read command RDCMD<1> and the second read command RDCMD<2> are instructions to perform sequential read operations. Since the second read command RDCMD<2> was inputted prior to the first read command RDCMD<1>, when the first read command RDCMD<1> is inputted at the step S10, the read operation corresponding to the second read command RDCMD<2> may have been completed.

If the first read command RDCMD<1> and the second read command RDCMD<2> are not determined as indicating the sequential read operations at the step S20 (No of the step S20), in other words, the first read command RDCMD<1> and the second read command RDCMD<2> are determined as the random read operations, the first count CNT1 for the first block corresponding to the first read command RDCMD<1> may be increased at step S40.

After the step S40, the read operation corresponding to the first read command RDCMD<1> may be performed at step S60.

If the first read command RDCMD<1> and the second read command RDCMD<2> are determined as indicating the sequential read operations at the step S20 (Yes of the step S20), it may be further determined whether the first block corresponding to the first read command RDCMD<1> and the second block corresponding to the second read command RDCMD<2> are the same block at step S30.

If the first block corresponding to the first read command RDCMD<1> and the second block corresponding to the second read command RDCMD<2> are the same at the step S30 (Yes of the step S30), the read operation corresponding to the first read command RDCMD<1> may be performed at step S60.

If the first block corresponding to the first read command RDCMD<1> and the second block corresponding to the second read command RDCMD<2> are not the same at the step S30 (No of the step S30), the second count CNT2 for the first block corresponding to the first read command RDCMD<1> may be increased at step S50.

After the step S50, the read operation corresponding to the first read command RDCMD<1> may be performed at step S60. After performing the read operation corresponding to the first read command RDCMD<1> at step S60, it may be checked whether the sum value CSUM for the first block corresponding to the first read command RDCMD<1> is greater than the reference value CREF at step S70. Here, the sum value CSUM for the first block may be a value {CNT1*a}+{CNT2*b}, which is obtained by adding a first value CNT1*a obtained by applying the first weight a to the first count CNT1 for the first block to a second value CNT2*b obtained by applying the second weight b to the second count CNT2 for the first block.

If the sum value CSUM is greater than the reference value CREF at the step S70 (Yes of the step S70), the read reclaim operation for the first block may be performed at step S80. If the sum value CSUM is not greater than the reference value CREF at the step S70 (No of the step S70), the process ends without performing the read reclaim operation for the first block.

It is apparent to one ordinary skilled in the art that various embodiments of the present disclosure are not limited to the embodiments described above and the attached drawings, and the embodiments described above may be variously substituted, changed, and modified in various ways without departing from the scope of the present disclosure.

What is claimed is:

1. A memory system comprising:
   a memory device including a plurality of memory blocks; and
   a controller configured to manage a first count, a second count, and a sum value for each of the plurality of memory blocks, the first count being the number of performed random read operations, the second count being the number of performed sequential read operations, the sum value being calculated based on the first count and the second count, and configured to perform a read reclaim operation for a specific memory block among the plurality of memory blocks based on a comparison result of the sum value for the specific block with a reference value.

2. The memory system according to claim 1, wherein the controller is configured to calculate a first value for each of the plurality of memory blocks by applying a first weight to the first count, a second value for each of the plurality of memory blocks by applying a second weight to the second count, and the sum value by adding the first value and the second value, and configured to perform the read reclaim operation for the specific memory block of which the sum value is greater than the reference value.

3. The memory system according to claim 2, wherein the controller is configured to set the second weight to be greater than the first weight.

4. The memory system according to claim 3, wherein the controller is configured to set the second weight to be in a range from 7000 times to 10000 times greater than the first weight.

5. The memory system according to claim 2, wherein the controller includes:
an internal memory configured to store the first count, the second count, the sum value, and the reference value for each of the plurality of memory blocks; and
a processor, when a first read command is inputted from a host, configured to compare the first read command with a second read command inputted prior to the first read command, check whether the first read command and the second read command indicate sequential read operations, calculate the first count, the second count, and the sum value for a first block corresponding to the first read command in accordance with the check result, update the first count, the second count, and the sum value for the first block stored in the internal memory based on the calculated first count, second count, and sum value, and perform a read reclaim operation for the first block if the sum value for the first block is greater than the reference value.

6. The memory system according to claim 5, wherein the processor is configured to determine whether the first read command and the second read command indicate sequential read operations based on whether a first address corresponding to the first read command and a second address corresponding to the second read command are consecutive.

7. The memory system according to claim 5, wherein the processor is configured to:
increase the first count for the first block when the first read command and the second read command do not indicate sequential read operations;
selectively increase the second count for the first block based on whether the first block is the same as a second block corresponding to the second read command, when the first read command and the second read command indicate sequential read operations; and
calculate the sum value for the first block by adding the first value for the first block obtained by applying the first weight to the first count to the second value for the first block obtained by applying the second weight to the second count.

8. The memory system according to claim 7, wherein the processor is configured to increase the second count for the first block when the first block is different from the second block, and keep the second count for the first block constant when the first block is the same as the second block.

9. The memory system according to claim 2, wherein the read reclaim operation is an operation of moving valid data stored in the memory block of which the sum value is greater than the reference value to another memory block.

10. A memory controller comprising:
an internal memory configured to store a first count, a second count, a sum value, and a reference value for each of a plurality of memory blocks included in a memory device; and
a processor, when a first read command is inputted from a host, configured to compare the first read command with a second read command inputted prior to the first read command, increase the first count for a first block corresponding to the first read command when the first read command and the second read command do not indicate sequential read operations, selectively increase the second count for the first block based on whether the first block is the same as a second block corresponding to the second read command when the first read command and the second read command indicate sequential read operations, and selectively perform a read reclaim operation for the first block in accordance with a comparison result of the sum value for the first block with the reference value for the first block,
wherein the sum value for the first block is calculated based on the first count for the first block and the second count for the first block.

11. The memory controller according to claim 10, wherein the controller is configured to calculate a first value for the first block by applying a first weight to the first count for the first block, a second value for the first block by applying a second weight to the second count for the first block, and the sum value for the first block by adding the first value and the second value, and configured to perform the read reclaim operation for the first block when the sum value for the first block is greater than the reference value for the first block.

12. The memory controller according to claim 11, wherein the processor is configured to set the second weight to be higher than the first weight.

13. The memory system according to claim 12, wherein the processor is configured to set the second weight to be in a range from 7000 times to 10000 times greater than the first weight.

14. The memory controller according to claim 11, wherein the processor is configured to determine whether the first read command and the second read command indicate sequential read operations based on whether a first address corresponding to the first read command and a second address corresponding to the second read command are consecutive.

15. The memory controller according to claim 11, wherein the processor is configured to:
calculate the sum value for the first block by adding the first value for the first block obtained by applying the first weight to the first count for the first block to the second value for the first block obtained by applying the second weight to the second count for the first block and update the first count, the second count, and the sum value for the first block stored in the internal memory; and
perform the read reclaim operation for the first block if the sum value for the first block is greater than the reference value for the first block.

16. The memory controller according to claim 11, wherein the processor is configured to increase the second count for the first block when the first block is different from the second block, and keep the second count for the first block constant when the first block is the same as the second block.

17. The memory controller according to claim 11, wherein the read reclaim operation for the first block is an operation of moving valid data stored in the first block of which the sum value is greater than the reference value to another block.

18. An operating method of a memory controller, comprising:
- checking, when a first read command is inputted from a host, whether the first read command and a second read command inputted prior to the first read command indicate sequential read operations by comparing the first read command with the second read command;
- increasing a first count for a first block corresponding to the first read command when the first read command and the second read command do not indicate sequential read operations;
- selectively increasing a second count for the first block based on whether the first block is the same as a second block corresponding to the second read command when the first read command and the second read command indicate sequential read operations; and
- comparing a sum value for the first block with a reference value and selectively performing a read reclaim operation for the first block in accordance with a comparison result,
- wherein the sum value for the first block is calculated based on the first count and the second count.

19. The method of claim 18, wherein the sum value for the first block is calculated by obtaining a first value for the first block by applying a first weight to the first count, obtaining a second value for the first block by applying a second weight to the second count, and obtaining the sum value for the first block by adding the first value and the second value.

20. The method of claim 18, wherein the read reclaim operation for the first block is performed when the sum value for the first block is greater than the reference value.

* * * * *